United States Patent [19]

Warzel

[11] 4,260,568
[45] Apr. 7, 1981

[54] METHOD FOR FEEDING WASTE YARN TO AN EXTRUDER

[75] Inventor: Fred M. Warzel, Bartlesville, Okla.

[73] Assignee: Phillips Petroleum Co., Bartlesville, Okla.

[21] Appl. No.: 48,104

[22] Filed: Jun. 13, 1979

Related U.S. Application Data

[62] Division of Ser. No. 870,156, Jan. 17, 1978, Pat. No. 4,175,870.

[51] Int. Cl.$^3$ .......................................... B29H 19/00
[52] U.S. Cl. .................................. 264/37; 264/176 R
[58] Field of Search ............................ 264/37, 176 R

[56] References Cited

U.S. PATENT DOCUMENTS

| | | | |
|---|---|---|---|
| 3,344,218 | 9/1967 | Chapra et al. | 264/37 |
| 3,500,500 | 3/1970 | Capdevila | 425/382.2 |
| 3,988,406 | 10/1976 | Nakamura et al. | 264/37 |
| 4,065,599 | 12/1977 | Nishiumi et al. | 428/15 |

*Primary Examiner*—Jay H. Woo

[57] ABSTRACT

Method for aspirating and propelling waste yarn into extruder or molding machine which comprises using a forwarding jet or yarn aspirator to feed a created wad of yarn into a hopper feeding pellets to an extruder or molding machine or the like, the operation being further characterized in providing and using a hood extending into the hopper to protect the wad until it can be picked up within the pellet mass flowing downwardly over and around the provided hood.

In one embodiment of the method a godet roll is used, powered by a motor, for feeding the yarn to the aspirator at a controlled, desired speed. In a modification of the method, once the wad is being taken into the pellet mass and is being drawn by the extruder screw or by other means feeding a molding machine, etc., the air to the aspirator can be shut down in part or totally.

3 Claims, 3 Drawing Figures

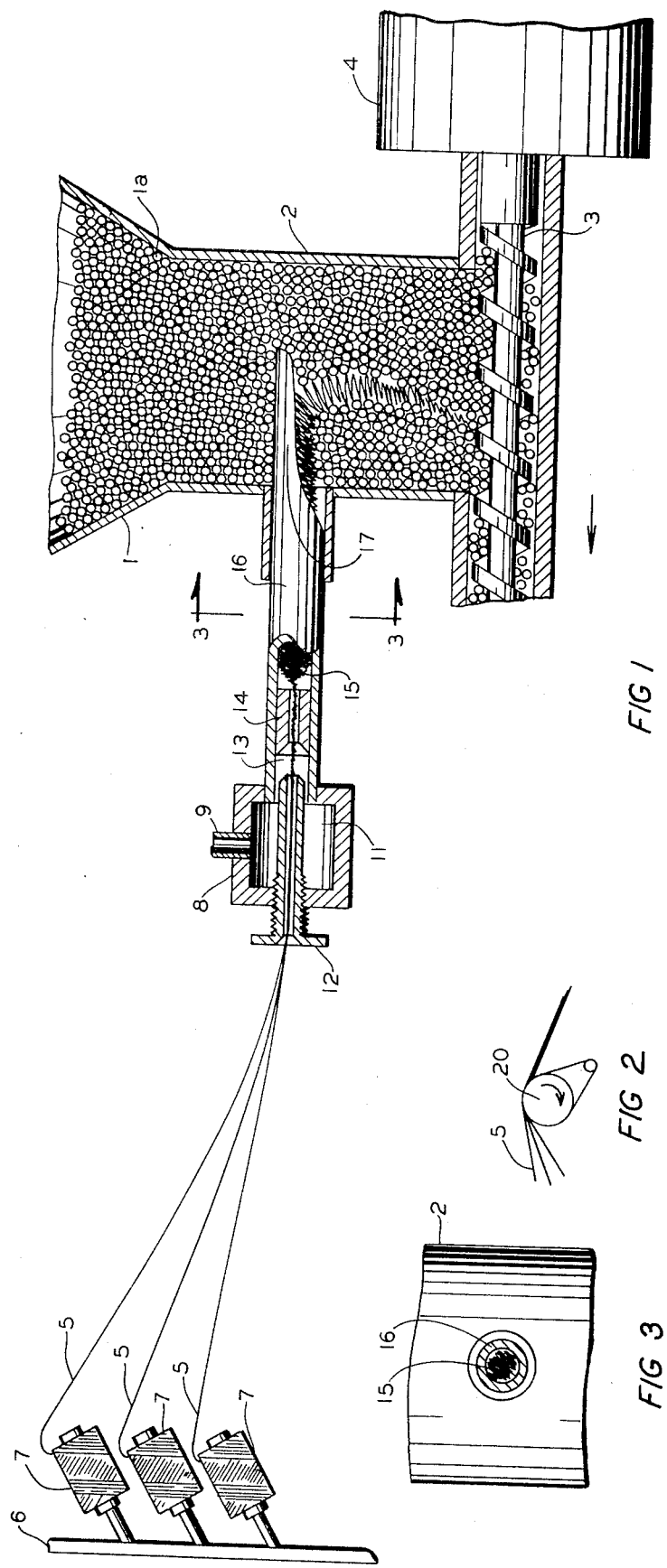

METHOD FOR FEEDING WASTE YARN TO AN EXTRUDER

This application is a division of my copending application having Ser. No. 870,156, filed Jan. 17, 1978, now U.S. Pat. No. 4,175,870.

This invention relates to the feeding of waste yarn to an extruder molding machine, or the like.

In one of its aspects the invention relates to the provision of an operation whereby waste yarn can be effectively fed into a mass of pellets being fed to an extruder screw, molding machine or the like.

In one of its concepts the invention provides a method for feeding waste yarn in the form of a wad thereof into a moving mass of pellets by steps comprising aspirating said yarn into a wad-forming zone and passing the thus created wad into a mass of moving pellets while shielding said wad from substantial contact with the pellets until it has reached a desired locus within the moving mass of pellets. In another of its concepts the invention provides the operation of the method in an apparatus comprising in combination means for aspirating a yarn, means for forming a wad of yarn and means for conducting said wad of yarn in shielded manner into a mass of moving pellets. In a more specific concept of the invention there is provided a method using in the operation of the method a forwarding jet or yarn aspirator, such as known in the art, in combination with a feed pipe extending into a conduit adapted to conduct a mass of pellets, the feed pipe being cut away to form a hood, the hood portion of the feed pipe facing upstream within said conduit, as more fully described herein. The apparatus disclosed herein is claimed in the present application.

In a synthetic fiber manufacturing plant, a certain amount of yarn normally is considered to be waste. Such yarn is sought to be recovered as by feeding it to some unit making use of a material which has substantially the same composition as the yarn, e.g., to an extruder spinning filament yarn from pellets having essentially the same composition as that of the yarn. Such yarn is difficult to feed because of its bulk and the difficulty of handling the same. Thus the waste yarn generated in a plant which melt spins yarn presents a constant problem. Thus waste yarn is normally sold as scrap to people who are willing to buy it at low prices, chop, densify it, and use it in molding articles such as toys, etc. Since a yarn may be solution colored, the color of the waste adds complexity to the problem of trying to recycle it with other yarns differently colored. The adding of waste yarn to an extruder always presents a problem since it must be densified in order to eliminate its contained air and to control the volume introduced to the extruder. It must be carefully proportioned to the amount of virgin resin fed to the extruder. Recycled yarn may also influence the physical properties of the yarn being spun.

I have now conceived a method for feeding waste yarn to an extruder or other machine being fed with pellets or similar shaped material to be extruded or otherwise formed. It has occurred to me to use a conventional or typical forwarding jet with which to aspirate and to propel the yarn into, say, a mass of pellets moving toward the screw of an extruder. The yarn which has been aspirated is formed into a wad which is then propelled through a tube forming within the mass of moving pellets a shield or hood permitting the wad to be propelled or, so to speak, injected into the mass of moving pellets and to be taken up and carried thereby through the extruder screw, thus actually feeding the wad of waste yarn into the body of the pellets thereby avoiding any untoward or undesirable mashing of the wad against the conduit or hopper feeding the mass of pellets through the screw of the extruder.

It is an object of this invention to provide a method for feeding waste yarn to a place of utilization. It is another object of this invention to provide a method for feeding waste yarn into a mass of moving particulate material, say, a mass of pellets moving through an extruder screw or through a molding machine. It is a further object of this invention to provide a method for forming a wad of waste yarn and conducting said wad in protected fashion into within the body of a mass of moving particulate material, say, pellets moving toward an extruder screw or other place of utilization.

Other aspects, concepts, objects and the several advantages of the invention are apparent from a study of this disclosure, the drawing and the appended claims.

According to the present invention there is provided a method for supplying yarn as from a creel or other means of yarn storage by means of a fluid forwarding jet into a restricted passageway wherein yarn is formed into a wad, i.e., compressed and then conducting said wad in protected manner into the body of a moving or flowing mass of particulate material, say, pellets being fed through a conduit or hopper to the screw of an extruder or being fed to a molding machine, etc.

Also according to the present invention the method is carried out in an apparatus which comprises essentially a forwarding jet, activated as by air, to draw yarn as from a creel thereinto, means for restraining yarn being forwarded to cause it to wad, means for conducting said wad in a protected manner into a conduit adapted to flow a mass of particulate material to the screw of an extruder, said means being formed to provide a hood or hoodlike portion and so positioned as to form a fender to fend away the solid particles flowing through said conduit thus to permit the wad to emerge from said means for feeding said wad in protected manner.

An advantage of the present invention resides in that the method of the invention and the means employed to carry out the invention are suitable to permit control of the precise proportion of waste yarn to be added, especially where color may be involved or other physical properties of the final product are difficult to attain.

The waste yarn to which this invention can be applied can be freshly spun yarn, drawn or undrawn, flat yarn (i.e., nontextured yarn), or textured yarn.

The waste yarn can be of a natural resin color, dyed, or pigmented, often called solution-dyed yarn. The feeding of waste yarn to an extruder for recycling presents many mechanical handling problems involving: the rate of feed, the need for densification, and the lack of suitable equipment for handling a fiber-type material. If the extruder is melt-spinning yarn, then the percentage of recycle must be kept low (less than 10 percent of the total feed rate to the extruder) in order not to affect adversely the physical properties of the yarn being spun. The color of the waste yarn must also be considered. Natural colored yarn can be fed with natural colored pellets and matching colors with matching colored pellets with the exception of black which will accept most colors without adverse effect on the color of the spun yarn. If the extruder is being used to mold articles such as in injection molding, the percentage of recycled yarn can be as high as 60 percent depending on the product being made.

The invention provides a method and utilizes an apparatus for controlling and feeding waste yarn to an operating extruder by providing supply of yarn into the neck of the hopper in a densified, compact cylindrical wad so that it can be carried to the extrusion screw by the downward force of the pellets comprising the main feed to the extruder. This is done by feeding the yarn to a forwarding jet or yarn aspirator which is well known in the art. The jet is provided with a hood-shaped nozzle extending into the neck of the hopper and into the mass of pellets therein. The extended portion is positioned with the hood over the yarn wad to protect the yarn wad formed in and by the aspirator from shearing action of down flowing pellets until it is picked up within the pellet stream by the downward force of the pellet feed stream.

In this first embodiment, the aspirator is operated with air providing the motive force to such and to then propel the yarn into the nozzle and the neck of the hopper.

In a second embodiment, the waste yarn is wrapped several turns around a godet (power driven roll) and then fed to the aspirator where the air provides essentially only a forwarding motion and wad-forming action since the amount of feed is controlled by the set of the godet.

FIG. 1 is a partial cross section showing an air-operated jet attached to the neck of the hopper or an extruder and withdrawing the yarn directly from yarn packages on a creel.

FIG. 2 shows an embodiment wherein a godet roll and its associated separator roll is inserted between the creel and the yarn forwarding jet.

FIG. 3 is a cross section of the nozzle along the line 303 of FIG. 1.

Now referring to FIG. 1, a hopper 1 having a straight diameter neck section 2 is positioned above the screw 3 of an extruder 4 shown in partial cross section for providing resin 1a to a spinning unit (not shown) or to an injection molding machine as well known in the art. A creel 6 is supplied with packages of waste yarn 7 for a supply of yarn 5 to an aspirator or jet 8. The aspirator 8 has an air inlet 9 providing air with about 20 psig to the plenum chamber 11. The yarn is drawn into and enters the opening in nozzle 12, exits the nozzle at 13 where the air contacts the yarn propelling it through the needle 14 of the jet 8. As the yarn exits the jet 8, it forms in the nozzle 16 a dense yarn wad 15 suitable for feeding to the extruder screw 3, as it is drawn away from the nozzle extending hood portion 17 by the downward flow force of the resin pellets feeding the extrusion screw 3.

In the alternate embodiment, the yarn 5 is wrapped a plurality of turns around the godet roll 20 and its associated separator roll which is powered by a motor (not shown) and at a speed desired for feeding the yarn to the extruder.

EXAMPLE

A Leesona yarn aspirator was provided with a nominal 1.0" (2.54 cm) diameter nozzle with the bottom half cut away 2.5" (6.35 cm) from the end in a smooth configuration as shown in the drawings to provide an opening 0.937" (2.37 cm)×2.5" (6.35 cm). The aspirator was inserted in the neck of a hopper having a cross-sectional area of 15.03 in.$^2$ (96.95 cm$^2$) on a 3.5" (8.89 cm) MPM (Modern Plastics Machinery Co.) extruder using an extrusion screw with a 20/1 L/D ratio.

The principle resin being supplied to the hopper of the extruder was 0.125" diameter (0.31 cm)×0.125" cylindrical pellets of polypropylene. The aspirator was operated with 20 psig (1.4 Kg/cm$^2$) air. One end of polypropylene yarn was fed from a yarn package weighing 5 lbs. 3 ozs. (2.35 Kg). Weighings of the remaining yarn after two successive 5 minute periods indicated that 3 oz. (85.02 gms) yarn was fed during each period. The total resin fed to the extruder was 150 lbs/hr (68.02 Kg/hr). The recycle feed rate was 2.25 lbs/hr (1.02 Kg/hr) or 1.5 percent.

In another demonstration of the invention ten yarns were simultaneously fed to the extruder through the aspirator for recycling waste.

The jet shown in the drawing is a typical forwarding jet. Any jet of this type can be used which will serve to pull and/or propel the yarn into the neck of the hopper. For example, a Lessona yarn aspirator made of similar construction and well known in the textile industry for forwarding yarn can be used. The drawing is shown with three yarns entering the jet to form the yarn wad. If it is desired, more than three yarns can be threaded into the jet. The air pressure to the jet must be such that the air injected into the hopper can escape without disturbing the movement of the main stream of the pellets being fed to the screw. The inventor has found that this air pressure can be in a range from 10 to 30 psig but preferably in the range of from 15 to 20 psig. If the air pressure is too high it tends to fluidize the pellets in the hopper and disturb the feed to the screw. Air is the preferred fluid for propelling the yarn into the hopper. Other fluids or gases could be used but are not now preferred for this purpose.

The inventor found that when feeding continuous-filament, waste yarn that once the feed is established and the yarn has reached the screw where it begins to twist around the screw, the air can be shut off and the screw allowed to pull the yarn. However, it is still preferred to use air in order to control the feed and form a yarn wad as shown in the drawing. Nevertheless it is within the scope of the claimed invention to shut off, periodically or totally, or to vary, the air supply once the yarn wad is reaching a drawing contact with the screw.

Reasonable variation and modification are possible in the scope of the foregoing disclosure, drawing and the appended claims to the invention, the essence of which is that waste yarn is wadded and the wad of waste yarn is protectedly ushered into a mass of moving particulate material, e.g., pellets moving toward the screw of an extruder or to a molding machine and that method to accomplish this concept basic to the invention, as in an apparatus described has been provided, substantially as described.

I claim:

1. A method for feeding yarn into a mass of moving particles which comprises condensing said yarn to form a wad and conducting said wad in protected manner into the body of a mass of moving particles being fed to an extruder or molding machine, the wad of yarn being protected from contact with said mass of moving particles until it has been fed into the body of said mass and the wad being then released from said protection into the body of said mass.

2. A method according to claim 1 wherein a fluid jet is provided to aspirate and to propel the yarn, the yarn is propelled into a wad-forming zone, shielding said forming yarn wad from substantial contact with the mass of moving particles, injecting the formed yarn wad into the mass of particulate material being fed to an extruder or molding machine, the wad being protected against substantial contact with said mass of particulate material until it has emerged into said mass of moving particulate material.

3. A method according to claim 1 wherein a plurality of yarns are aspirated into a yarn wad-forming zone, yarn thus wadded is passed through a conduit extending into a hopper through which particles are being fed to the screw of an extruder or to a molding machine, said conduit emitting said wadded yarn substantially only in a direction downstream, i.e., in a manner that the wad will flow with said particles.

* * * * *